United States Patent Office 3,436,950
Patented Apr. 8, 1969

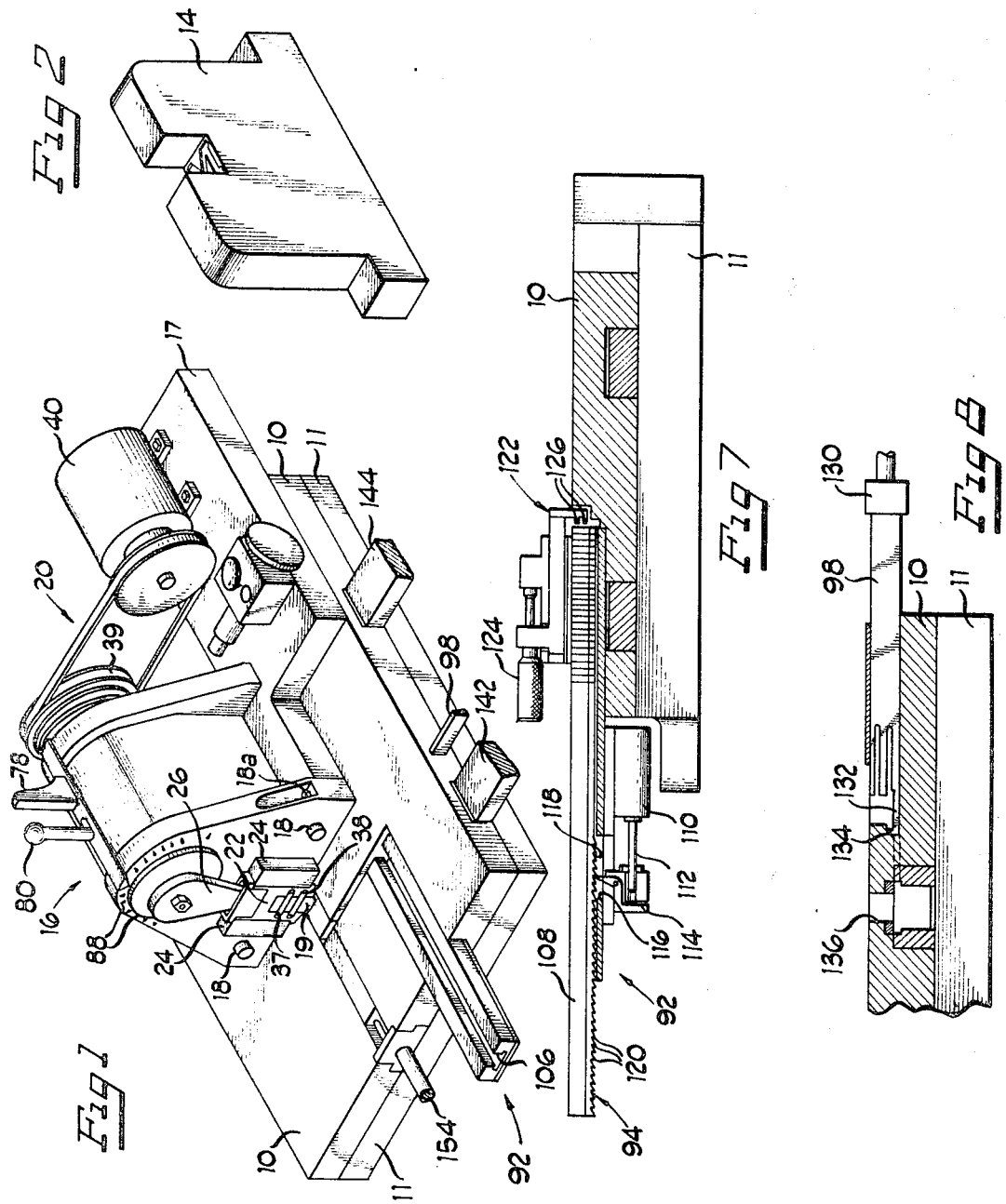

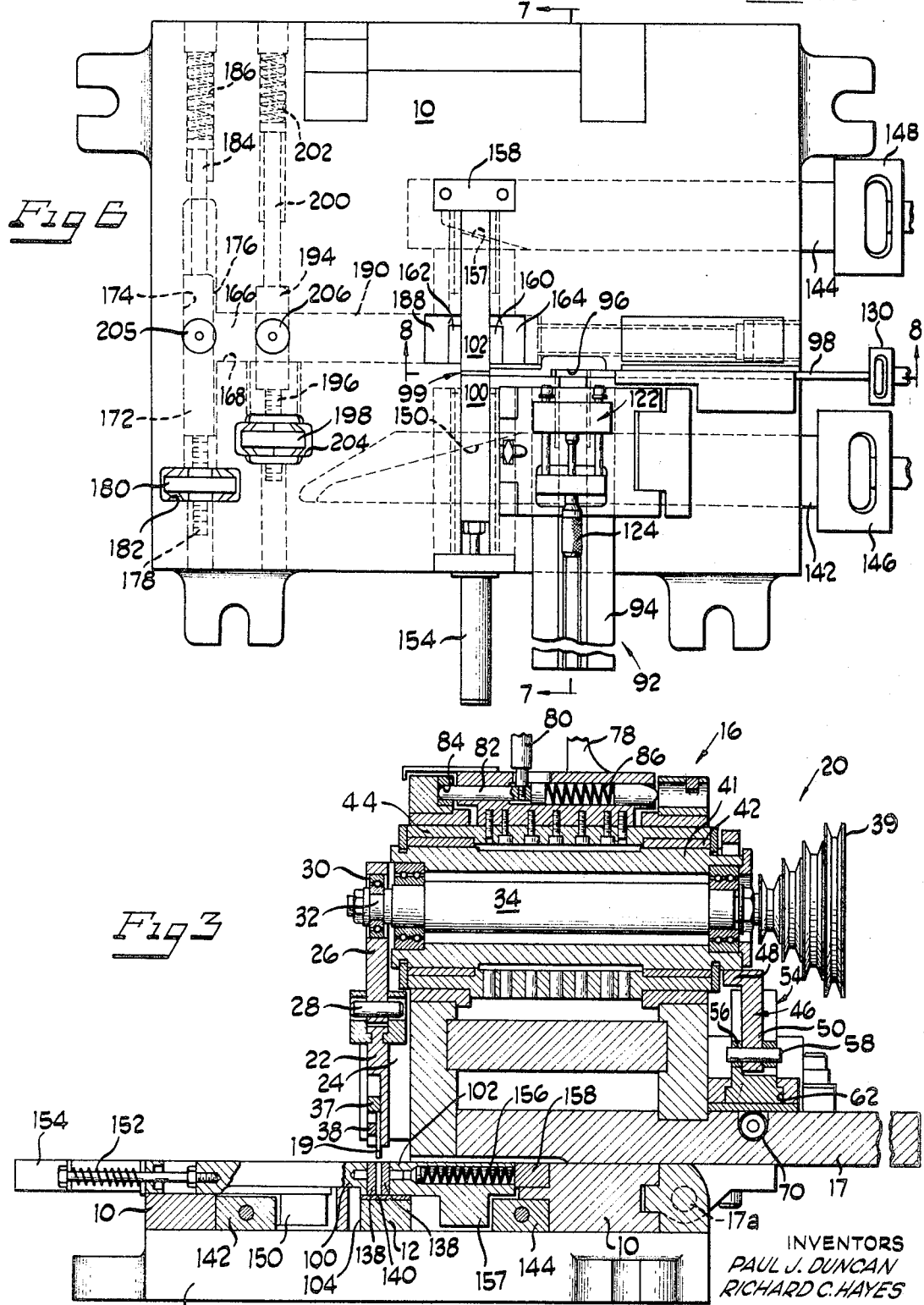

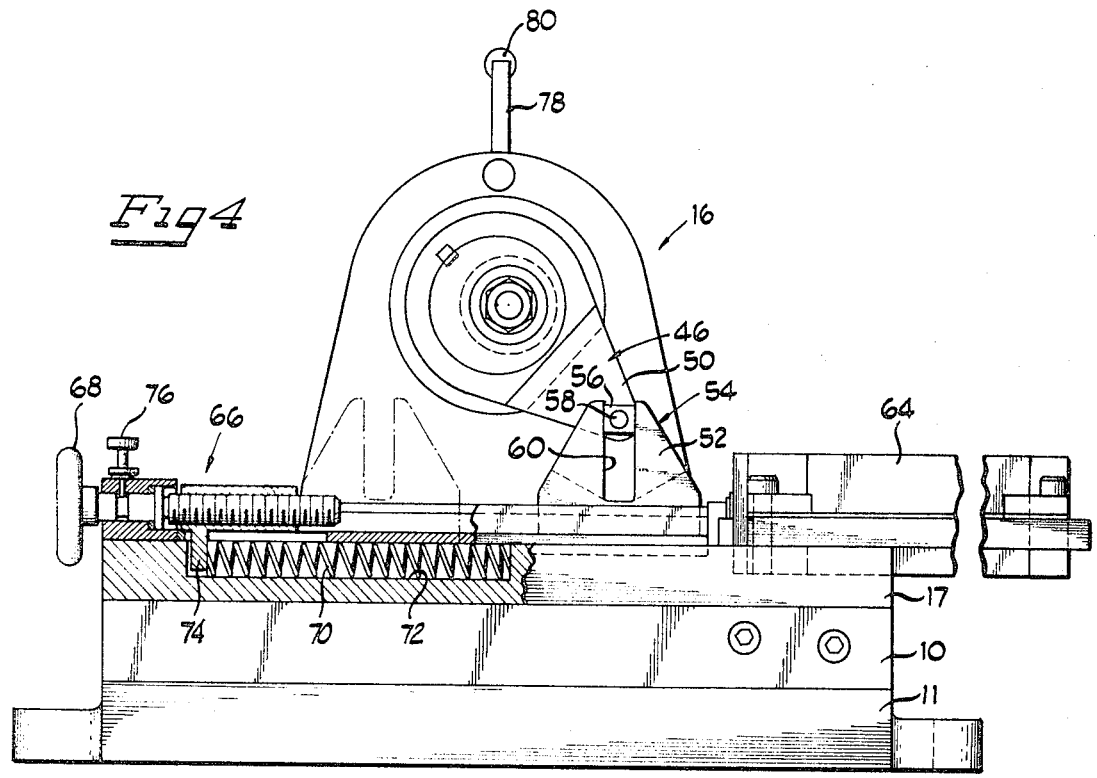
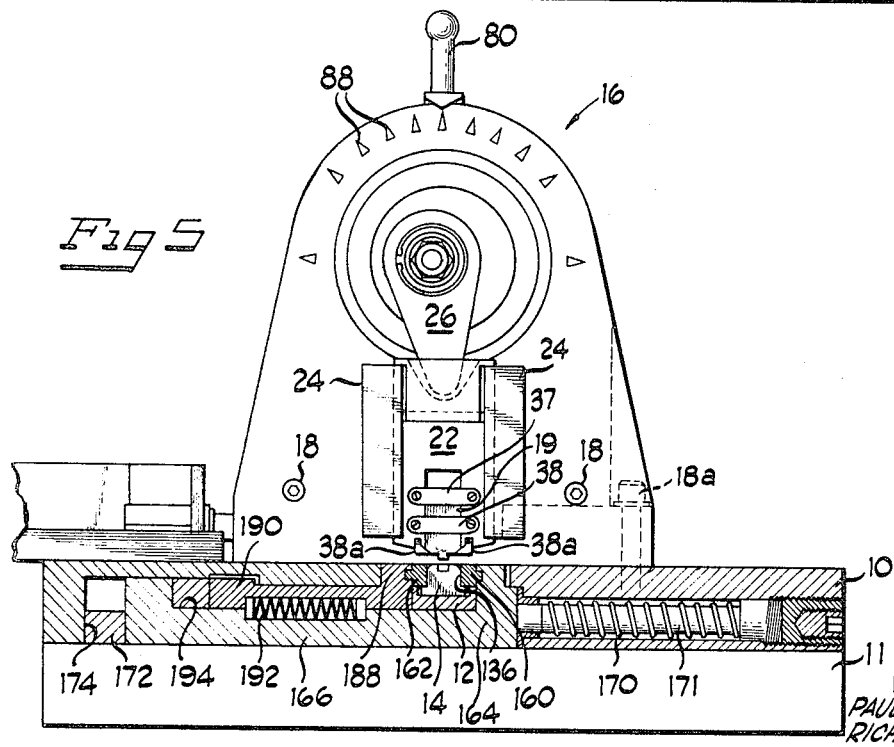

3,436,950
VIBRATORY STAMPING TOOL
Paul J. Duncan, Des Plaines, Ill., and Richard C. Hayes, Utica, Mich., assignors to Ludlow Typograph Company, Chicago, Ill., a corporation of Delaware
Filed Aug. 26, 1966, Ser. No. 575,424
Int. Cl. B21j 7/20, 9/18; B21d 43/20
U.S. Cl. 72—450                                                    11 Claims

ABSTRACT OF THE DISCLOSURE

An apparatus is provided which is particularly adapted to stamp articles through the use of a vibrating cutting tool progressively advanced into a workpiece. The vibration of the cutting tool and its advance into the workpiece are effected mechanically and provision is made for accurately controlling the extent of advance.

---

This invention relates generally to metal stamping and more particularly to an apparatus for manufacturing matrices for casting type slugs.

Various forms of apparatus have been developed to machine the surfaces of articles as by stamping, driving, coining or striking. Presently available apparatus are generally not capable of controlling the depth of such surface machining to a close tolerance and are thus not completely satisfactory in certain industries, e.g., the type forming industry, where such tolerances are not only desirable but essential.

For example, quality letterpress printing in a modern printing operation, using either Linotype or Ludlow-casting of type slugs, depends greatly on the degree of uniformity of the type slugs as well as on the skill and available time of the pressman in the "make-ready." Obviously, the more uniform in height are the slugs (or foundry type, if any, in the lock up) the more nearly plane is the impression of the assembled type surface and the less time and skill are needed of the pressman to prepare to print. There is, accordingly, a great need for accuracy in the overall height of the type-slug and, thus, for correspondingly greater accuracy in the letter-depth of the individual matrices which, when assembled, constitute the mold for the type slug.

Each individual matrix is typically a bronze or brass plate, hereinafter referred to an blank form as a "blank mat" for convenience of description. (See FIG. 2.) A face notch in an upper edge of the plate has an imprint of a letter or character in its base. An assembly of finished matrices forms a composite mold for a line of type.

In a conventional stamping press for forming such matrices, the matrix is forced upwardly against a metal die having the raised printing character on its face, forming the imprint in the base of the face notch. In manufacturing such matrices, one critical dimension which must be maintained is the distance between the base, or deepest point, of the imprint, i.e., that which produces the type face, and the lower surface of the matrix. This dimension governs the height of the type slug when it is cast from the matrix. At the present time, the standard height of type in English-speaking countries is 0.9186 inch, and it is desirable, for minimum "make-ready," that the aforementioned critical dimension of the matrix be maintained to a tolerance of twenty-five hundred-thousandths inch (0.00025").

In prior practice, the stamped imprint has been made in single-stroke presses. Such presses are not capable of maintaining the aforementioned tolerance, and also cause a flow of the matrix material resulting in undesirable bulges in the sides of the finished matrix.

The principal object of the present invention is the provision of an improved apparatus for the stamping of articles including, but not limited to, the stamping employed to transform a blank type casting mat into a finished matrix.

It is another object of this invention to provide a novel apparatus for manufacturing matrices to the extremely close tolerances desired in casting type.

It is a further object of the invention to provide an efficient apparatus for feeding blank mats into a press.

Other objects and advantages will become apparent from the following detailed description and the accompanying drawings wherein:

FIGURE 1 is a perspective view of a press and feed mechanism embodying the invention;

FIGURE 2 is an enlarged perspective view of a pre-slotted blank mat, which is imprinted by a press in accordance with the present invention;

FIGURE 3 is a vertical sectional view of the press illustrated in FIGURE 1;

FIGURE 4 is a side elevational view of the press illustrated in FIGURE 3 particularly illustrating the means for adjusting the vertical distance traversed by the punching die;

FIGURE 5 is a side elevational view of the side of the apparatus illustrated in FIGURE 3 opposite to that shown in FIGURE 4 particularly illustrating the punching die and its mode of linkage;

FIGURE 6 is a plan view of a feed mechanism utilized for feeding blank mats to a preselected location on the press for being imprinted;

FIGURE 7 is a sectional view taken along line 7—7 of FIGURE 6; and

FIGURE 8 is a sectional view taken along line 8—8 of FIGURE 6.

The apparatus of the present invention is especially suitable for stamping the type casting blank mats previously referred to and will therefore be described with respect to this particular application. However, it is to be understood that such particular application is presented by way of illustration of the applications which are available.

Generally, in accordance with the present invention, the die-stamping of mats is performed by forcing a stamping die into the surface of the mat and, at the same time, causing the die to vibrate in the direction of its stamping movement. The stamping die is thus caused to execute progressive vibratory movement as it is advanced into the mat until a desired depth of penetration is effected, whereupon the die is retracted and the imprinted mat or matrix is removed so that the cycle may be repeated. The term penetration used herein is not intended to imply an actual rupturing of the surface of the matrix but refers to any advancement of the die beyond the plane occupied by the machined surface of the matrix, i.e., the base of the face notch, prior to the machining operation.

Referring to the drawings, particularly FIGS. 1 and 3, the illustrated stamping mechanism includes a rigid support frame comprising an upper base plate 10 and a lower base plate 11. An anvil 12 is supported by the upper base plate 10 and serves to rigidly support blank matrices or mats which are to be stamped, the blank mats and finished matrices both being hereinafter designated by the numeral 14 (FIG. 5). A stamping press 16 is mounted on a heavy subplate 17 which in turn is hinged at 17a on the base plate 10. The press is normally secured to the subplate 17 in operating attitude by cap screws (not shown) which extend upwardly into the press frame from beneath, and by cap screws 18 which extend inward from the front wall of the press frame. The hinged attachment of the subplate 17 to the upper base plate 10 permits it to be tilted upwardly and rearwardly to facilitate access to certain of the operating components for purposes of adjustment and the like. An air cylinder or equivalent means (not shown) may be provided, if desired, to accomplish the tilting movement. The subplate is normally maintained in face-to-face contact with the upper base plate 10 by cap screws 18a which extend through the frame of the press 16 and into the upper base plate 10.

The press 16 carries a stamping die 19 which is in registration with the anvil 12, and which executes a generally linear, repetitive movement along a fixed path toward and away from the anvil 12. The press 16 includes a drive means 20, which is connected to the die 19 and serves to thrust the die toward the anvil, while simultaneously causing the die to vibrate in the direction of its stamping movement.

As shown particularly in FIGURES 3 and 5, the die 19 is carried in a slide 22 which reciprocates vertically on the frame of the press 16 in ways 24. The slide 22 is actuated by a pitman 26, which is journaled at one of its ends on a wrist pin 28 in the slide 22, and at its other end, by means of a roller bearing 30, on the eccentric journal 32 of a drive shaft 34. The eccentricity of the journal 32 is relatively minor in amount, being of the order of 10 to 15 thousandths inch (.010" to .015"), and therefore not readily discernible from the drawing.

The slide 22 is guided for its reciprocal movement by the ways 24 secured to the front face of the press upright. The slide 22 is provided with a die backup member 37 against which the upper end of the die abuts, which transfers the load from the die to the member 37. The die 19 is otherwise retained in position by a clamping bar 38. Spring loaded clips 38a are also provided and engage inclined surfaces of the die to urge it against the backup member 37, particularly while it is being clamped in place.

At the end of the drive shaft 34 is a step pulley 39 by which the shaft 34 may be rotated at relatively high speeds by a driving motor 40 and thereby, through the eccentric journal 32 and the pitman 26, to vibrate the slide 22 and the stamping die 19 vertically in the guides 24 as earlier described.

The major stroke of the slide 22, and thus of the stamping die 19, is derived from a relatively major vertical movement of the rotational axis of the shaft 34. This movement is accomplished by the mounting of the shaft 34 eccentrically within an intermediate sleeve 41 which, in turn, is rotatably mounted, by means of sleeve bearings 42, in an outer sleeve 44 (FIG. 3), the purpose of which will be more apparent later. The eccentricity of the rotational axis of the shaft 34 within the sleeve 41 is relatively major in mount, as will be readily apparent from FIGURES 4 and 5, and which, in a practical case, may amount to approximately one-fourth inch. It is, in any event, a major amount compared to the eccentricity of the journal 32 on the shaft 34. Thus, the rotation of the sleeve 41 raises or lowers the axis of the shaft 34, and acting through the pitman 26, moves the slide 22 and the stamping die 19 toward or away from the anvil 12.

The rotation of the sleeve 41 is accomplished by means of a crank arm 46 (FIGURES 3 and 4) which is offset outwardly at midlength 48 to position its end portion 50 between the flanking uprights 52 of a driving gib 54. Slide blocks 56 mounted on the end of the crank arm by a wrist pin 58 are confined in vertical slots 60 in the gib 54. As indicated in FIGURE 3, the driving gib 54 itself is confined in a sliding track 62 on the subplate 17, being moved along the track 62 between the solid-line and broken-line positions of FIGURE 4 by a double-acting hydraulic cylinder 64. As will be apparent from FIGURE 4, movement of the driving gib 54 from the solid-line to the broken-line position produces a rotation of the crank arm 46, and thus of the sleeve 41, of about one-fourth revolution, the crank arm 46 being affixed to the sleeve 41 in such a way as to lower the axis of the drive shaft 34 by the amount of its eccentricity in the aforesaid one-fourth revolution of the sleeve 41.

The exact limit of the movement of the driving gib 54, viz., the broken-line position of FIGURE 4, is determined by an adjustable stop 66 against which the driving gib 54 abuts to halt its movement. The position of the stop 66 may be adjusted by a hand screw 68 against the force of a biasing spring 70 retained in a groove 72 in the subplate 17 and having one of its ends engaged with a finger 74 on the stop member 66. Any desired position of adjustment of the stop 66 may be maintained by a set screw 76 which engages the stem of the adjusting hand screw 68.

By inspection of FIGURE 4, it will be noted that a relatively coarse positioning of the adjusting screw 68 may effect a relatively fine adjustment of the overall length of the stroke of the stamping die 19 because, at or near the end of the contemplated stroke of the driving cylinder 64, the die 19 is at or near bottom dead-center. Nevertheless, in order to provide the high degree of accuracy required in the type casting matrices, a still finer adjustment of the stamping stroke is desirable.

Reference was earlier made to the sleeve 44 in which intermediate sleeve 41 is journaled. The rotational axis of the sleeve 41 within the outer sleeve 44 is slightly eccentric being displaced from the rotational axis of the outer sleeve 44 by only one-thousandth of an inch, an amount not discernible from the drawings. Attached to the outer sleeve 44 is an adjusting handle 78 by means of which the sleeve 44 may be rotated. Standing alongside the adjusting handle 78 is the handle 80 of a locking pin 82 which is urged axially into one of a series of holes 84 in the upright of the press frame 10 by means if a spring 86. The positions of the holes 84 in the upright are noted by graduations 88 on the outside of the uprights (see (FIGURE 5) from which it will be apparent that the operator has a range of adjustment of 180 degrees of rotation of the sleeve 44. The total "throw," i.e., the linear displacement of the rotational axis of the sleeve 41, is divided into 10 equal steps reflected trigonometrically in the varied spacing of the graduations 88 in FIGURE 5 earlier referred to, and rotation of the sleeve 44 between graduations moves the axis of the intermediate sleeve 41 incrementally toward or away from the anvil 12 on the base plate 11, providing a very fine adjustment of the depth of the stamping stroke of the die 19.

Thus, in the illustrated apparatus there are essentially three basic movements of the stamping die 19, viz. (a) the vibratory movement induced by the eccentric journal 32 if the shaft 34, (b) the major stamping stroke effected by the rotation of the intermediate sleeve 41 in which the drive shaft 34 is eccentrically journaled, the length of that stroke being controlled by the adjustable stop 66 which limits the movement of the driving gib 54, and thus the rotation if the crank arm 46, and finally, (c) the extremely fine adjustment, to one ten thousandths of an inch, of the depth of the major stamping stroke by the very minor eccentricity with which the intermediate sleeve 41 is journaled in the outer sleeve 44. It may be readily visualized that when the machine is set up for a given stamping die, that is to say, when the coarse adjustment of the driving stroke of the hydraulic cylinder 64 is made, and whatever fine adjustment of the outer sleeve 44 that may be necessary has been made, and with the driving motor 40 running, the machine is ready for repeated stamping operation in which the blank mats are automatically placed beneath the stamping die and the stamped matrices removed from beneath the die, by the automatic feeding mechanism now to be described.

In the operation of the press, a blank mat 14 is supported on the anvil 12 in a desired orientation relative to the die 19, e.g., in the illustrated embodiment (FIG. 5), the blank mat is positioned so that the die will engage the mat at the center of the base of the notch provided in the mat. The blank mat is preferably securely held in this desired position.

Upon actuation of the motor 40, the shaft 34 is rotated, causing continued vertical vibratory movement of the die 19 at some distance above the blank mat 14. Upon actuation of the hydraulic cylinder 64, which causes rotation of the sleeve 41, the die 19 is moved downwardly and advanced into the mat while continuing to vibrate to provide the mat with the desired imprint. The depth of penetration of the die into the mat can be accurately controlled by varying the length of the stroke of the hydraulic cylinder 64 and by positioning of the fine adjustment handle 78 in the manner previously described.

In order that the mats 14 may be automatically positioned one at a time in registry with the die 19 for imprinting, and then automatically discharged as a completed matrix, a feed mechanism 92 is provided (FIG. 7) and includes a magazine 94 for holding a quantity of blank mats. As seen in FIGS. 1 and 6, the magazine 94 extends horizontally outwardly from one side of the base plate 11 to facilitate loading. The mat blanks are urged forwardly in the magazine 94, which discharges them one at a time into a transfer channel 96 (FIG. 6), where they are received by a transfer carriage 98, and moved endwise horizontally to a second station 99 at which the blank mat is gripped on its opposed faces by holding jaws 100 and 102 (FIGS. 3 and 6) which serve the dual purposes of further transporting the blank mat to the anvil 12, confining it thereon during the stamping operation, and removing it from the stamping station to a discharge point at which the stamped matrix is released to drop through an aperture 104 (FIG. 3) in the base plate 11. By a further movement, the jaws 100 and 102 return to registry with the transfer channel 96 to receive a new mat blank with which to repeat the cycle.

As shown in FIGURE 1 and 7, the magazine 94 is adapted for receiving the blank mat 14 in upright position. The walls of the magazine 94 form a longitudinally extending T-shaped channel 106, which conforms to the cross-section if the mat 14 (compare FIG. 2). The plurality of mats 14 positioned within the magazine 94 are urged forwardly in the magazine by a push rod 108 which conforms in cross-section to the blank mats and to the channel 106.

The push rod is advanced by a double-acting air cylinder 110 mounted on the underside of the magazine. It carries on its piston rod 112 a feed pawl 114 which extends upwardly through a slot 116 in the floor of the magazine 94 to engage a ratchet rack 118 on the bottom of the push rod 108. Thus, as respective ratchet teeth 120 are engaged by the pawl 114 as the cylinder 110 reciprocates, the mat blanks are successively supplied to the transfer channel 96.

To accommodate the mechanism to mat blanks of varying thickness (occasioned by different widths of printing characters), and to insure the delivery of the blanks singly into the transfer channel 96, the lead blank, leaving the magazine 94 under the driving force of the push bar 108, abuts an adjustable stop gauge 122 (omitted for the sake of clarity from FIG. 1), which may be advanced toward or retracted from the end of the magazine by an adjusting thumb screw 124. The blank-engaging face of the gauge 122 is notched to provide two vertically spaced contact fingers 126, the purpose of that configuration later becoming evident.

The mat blank 14 is discharged from the magazine 94 onto the transfer carriage 98, which is a flat rod having an endwise reciprocal sliding movement in the transfer channel 96, being moved therein by a double-acting air cylinder connected through coupler 130 (FIG. 8). The end of the transfer carriage 98 is milled to conform to the outline of the mat blank 14 and, at normal repose, receives the blank directly, in a sliding action, as it is discharged from the magazine 94. A forwardly extending finger 132 at the end of the carriage 98 underlies and supports the blank mat, which is held thereon by an upstanding ledge 134 at the tip of the finger 132. The portion of the carriage 98 which conforms to the other side of the blank is slotted to clear the fingers 126 of the adjustable gauge 122 on the delivery stroke of the transfer carriage 98. When the transfer carriage 98 reaches the end of its delivery stroke (far left in FIG. 8) the blank is registered with the conforming faces of the holding jaws 100 and 102.

The holding jaws 100 and 102 are reciprocable in a channel 136 in the base plate 11, the upper portion of the channel 136 (FIGS. 2 and 8) conforming in cross-section to the cross-sections of the blank mats 14 and of the engaging faces of the holding jaws 100 and 102. From FIG. 3 it will be noted that by a relatively short movement in their channel 136, the jaws 100 and 102 remove the blank mat 14 from the transfer carriage 98, and place it on the anvil 12 beneath the die 19. The jaws 100 and 102 and the anvil 12 itself are preferably provided with renewable wear surfaces 138 and 140, respectively, as indicated in FIG. 3.

The aforementioned movement of the holding jaws 100 and 102 is accomplished by driving cams 142 and 144 respectively, each of which is driven by a double-acting air cylinder connected through couplers 146 and 148. From FIG. 6 especially, it will be noted that a major movement of drive cam 142 is contemplated (to the left in FIG. 6), the cam engaging an inclined forward edge 150 of the jaw 100 to shift the jaw 100, and the blank mat 14 and the far jaw 102 rearwardly. The jaw 100 is moved against the action of a return spring 152 whose housing 154 may be seen extending from the base plate 10 parallel to the magazine 94. The far jaw 102 is likewise biased by a return spring 156 (FIG. 3) which opposes the aforementioned movement of the mat blank 14 to the anvil 12. The jaw 102 rides above the cam 144 but includes a depending arm 157 provided with a canted surface engageable by the cam 144 to effect forward movement of the jaw. The rearward end of the jaw is thus free to engage a stop block 158 fixed to the base plate 10 which limits rearward movement of the jaw and positively locates the matrix with respect to the anvil 12 and die 19. The associated drive cam 144 is in a slightly withdrawn position when the jaw is in engagement with the stop 158 and serves primarily to drive the jaw 102 forward after the machining operation, such positive action being frequently necessary to free the matrix when the flow of the material during machining causes the matrix to become wedged between guiding ways 160 and 162, hereinafter described. After the matrix has been thus freed, it is moved additionally by the action of the spring 156.

The mat blank is confined on the anvil 12 against movement perpendicular to the transfer axis by the ways 160 and 162 which form extensions of the sides of the channel 136 in which the jaws 100 and 102 move, and which are themselves adjustable toward and away from the stamping axis to compensate for wear and to assure accurate lateral alignment of the die with respect to the matrix 14. However, the ways are normally maintained in stationary positions in which they are spaced from each other only sufficiently to receive a matrix therebetween in close fitting relationship. To permit ease of insertion of the matrix between the ways, the forward portions of the sides and bottoms thereof are preferably canted outwardly and upwardly slightly respectively and serve to guide the matrix into its proper position.

To effect the adjustment of the ways, the way 160 (right hand in FIG. 5) is mounted tongue-in-groove in an upstanding boss 164 on a slide bar 166 which is confined for endwise movement in a channel 168 in the upper base plate 10 of the mechanism. The way 160 is urged toward the die axis (to the left in FIG. 5) by a spring 170 disposed in encircling relation to a threaded rod 171 which serves as an adjustable stop determining the rightmost position of the bar 166. Precision in the placement of the way 160 is accomplished by a cam block 172 also confined in a channel 174 in the base plate 11 of the mechanism for an adjusting movement perpendicular to that of the slide bar 166, and whose inclined surface 176 engages the end of the slide bar 166. A threaded stem 178 extending out at one end of the cam block 172 is received in a knurled hand nut 180, which is confined against endwise movement in a hole 182 in the base plate 11. Thus, as the hand nut 180 is turned, the cam block 172 is drawn across the end of the slide bar 166, thus shifting the abutment against which the spring 170 urges the slide bar 166. A backing pin 184 urged by a spring 186 bucks the cam block 172 on the end opposite its threaded stem 178 to take up the operating clearance in the threads of the nut 180 and to keep the nut urged against one face of the hole 182 in the plate 17, thereby to permit the reliable graduation of the hand nut 180 to record any given position of the way 160.

The opposite way 162 is similarly mounted tongue-in-groove in the upstanding boss 188 of a smaller slide bar 190, which is confined for endwise reciprocable movement on the slide bar 166 and urged thereon by means of a spring 192 to move the way 162 away from the stamping axis. A cam block 194 similar to that which positions the slide bar 166 is supported by the base plate adjacent the end of the slide bar 190 opposite the upstanding boss 188 thereof and, when moved endwise, positions the way 162 relative to the opposed way 160. The cam block 194 serves as a limit to the movement of the way 162 toward the right in FIGURE 5. As with the cam block 172, the cam block 194 is similarly adjusted by means of a threaded stem 196 and knurled hand nut 198, and is backed by a pin 200, urged by a spring 202, as seen in FIGURE 6. By comparing FIGURE 6 and FIGURE 5, it will be seen that the range of movement of the ways 160 and 162, both relative to each other and relative to the stamping axis, is very slight, being only that necessary to accurately position the ways in the initial setup of the machine, and thereafter to adjust for wear. As earlier indicated, nevertheless, to permit the slight displacement of the cam block 194 occasioned by adjusting lateral movement of the slide bar 190, the knurled adjusting nut 198, which adjusts the cam block 194, is mounted in a confining block 204 which itself is shiftable transversely of the axis of the associated threaded stem 196. In addition, set screws 205 and 206 are provided which engage the cam blocks 192 and 194 so as to maintain these cam blocks in a desired position. As will be noted from FIGURE 5, the ways 160 and 162 are of such size that they engage the upper surfaces or shoulders of the matrix and thus hold it firmly on the anvil 12, thereby minimizing distortion of the lower surface of the matrix and preserving the critical dimension between the lower surface and the base of the imprint. As has already been mentioned, the ways also serve to laterally align the die 19 and matrix.

The operation of the aforementioned air cylinders to accomplish the foregoing feeding movements, transfer actions, and stamping stroke of the die is controlled by an automatic cycling device which is not of itself a part of the invention, and may, for example, be electrical so as to operate the air cylinders by means of solenoid valves. The cycle of operation may be thought of as beginning with the delivery of the leading mat blank 14 from the magazine 94 against the stop gauge 122 under the driving force of the push rod 108 and its actuating cylinder 110. During this movement the transfer carriage 98 is at its position of repose and receives the leading blank mat by that delivery movement, the gauge 122 having previously been adjusted to a depth corresponding to the thickness of the mat blank. The programming device thereupon calls the driving cylinder of the coupler 130 for the transfer carriage 98 into play, moving the same to the left and dwelling there for a length of time sufficient to bring the driving cylinder 146 for the drive cam 142 into action to bring the jaw 100 into contact with the mat blank on the transfer carriage 98 to drive it up against the face of the opposing jaw 102, thereby moving both jaws endwise until the jaw 102 contacts the stop block 158, placing the blank mat on the anvil 12 beneath the die 19. When the blank mat is so positioned and locked against movement along the transfer axis by the actuation of the locking slide bar 166, the drive cylinder of the coupler 130 of the transfer carriage 98 is actuated in the reverse direction returning the transfer carriage 98 to its position in repose in FIGURE 8. A comparison of the mat-blank-holding conformation of the end of the transfer carriage 98 with the cross-section of the holding jaw 100 will indicate that they are interlocked during the transfer movement of the jaws 100 and 102, the aforementioned withdrawal of the transfer carriage 98 being accommodated by an appropriately positioned notch 208 in the under surface jaw 100.

When the stamping action is completed and the stamping die 19 is withdrawn upwardly, the stamped matrix, still confined between the jaws 100 and 102, is returned to the intermediate transfer station by the action of the cam 144 and the jaw backing springs 152 and 156 upon the withdrawal of the drive bar 142. The withdrawal movement of the jaw 102 terminates earlier than the withdrawal movement of the jaw 100 so that the jaws release the stamped matrix at the intermediate transfer station. Inasmuch as the transfer carriage 98 was previously withdrawn, the completed matrix falls through the registering aperture 104 for collection and the foregoing cycle of operation is repeated on the next blank mat.

Various changes and modifications of the above-described method and apparatus will occur to those skilled in the art without deviating from the spirit or scope of the invention which features are defined in the following claims.

What is claimed is:

1. An apparatus for stamping articles comprising a support frame, an anvil mounted on said frame for supporting said articles, a die supported on said frame for linear movement along a fixed path toward and away from said anvil, a shaft having thereon an eccentric journal mounted for rotation adjacent said anvil, a pitman link connected between said eccentric journal and said die to thereby communicate to said die the vibration induced by said eccentric journal when said shaft rotates, drive means connected to said shaft for effecting rotation thereof, and means for thrusting said die toward said anvil along said path while said die vibrates in said path.

2. An apparatus in accordance with claim 1 wherein means are provided for limiting the flow of the material forming the article during the stamping thereof.

3. An apparatus in accordance with claim 1, wherein said means for thrusting said die toward said anvil includes a sleeve journaled in said support frame and surrounding said shaft with said shaft journaled eccentrically within said sleeve, and means coupled to said sleeve for effecting rotation of said shaft.

4. An apparatus in accordance with claim 3 wherein said means coupled to said sleeve for effecting rotation thereof includes a crank means secured to said sleeve and movable between adjustable limits, thereby positioning the axis of rotation of said shaft.

5. An apparatus in accordance with claim 4 wherein said crank means includes a crank arm secured to said sleeve, a gib movably mounted on said frame and having a slot therein, means carried within said slot for pivotally connecting said gib to said crank arm, and actuating means engaging said gib for effecting displacement of said gib, thereby causing rotation of said sleeve.

6. An apparatus in accordance with claim 3 including an outer sleeve eccentrically journaled about said sleeve and a fine adjustment means operatively coupled to said outer sleeve for effecting graduated amounts of rotation thereof, thereby moving the axis of said sleeve toward or away from said anvil.

7. A feed mechanism for supplying blank mats to a press having a die for imprinting matrices for use in casting type, which mechanism comprises a frame, a magazine supported on said frame for receiving a plurality of mats, means associated with said magazine for moving said mats along said magazine such that each mat in turn is positioned at a first station, a transfer carriage at said first station for receiving said mat from the magazine and transferring the same to a second station in a longitudinally extending channel, a pair of mating jaw members in said longitudinal channel flanking said second station for engaging opposite faces of said mat, means for moving said jaw members in said channel to grip the mat and to transfer the mat to and from a stamping position while maintaining said engagement, other means at said stamping position for confining said mat on an axis normal to the direction of the transfer movement of the jaws, means for releasing the engagement of at least one of said movable jaws from said mat as said mat is removed from said stamping position, and means defining a discharge aperture in the floor of said channel at said second station through which the mats gravitate after being imprinted.

8. A feed mechanism in accordance with claim 7 including an adjustable gauge mounted on said magazine for the ejection of mats of varying thickness singly from said magazine.

9. A feed mechanism in accordance with claim 7 wherein said transfer carriage includes a projecting member which overlies the opening of said discharge aperture and underlies and supports respective mats ejected from said magazine.

10. A feed mechanism in accordance with claim 7 wherein said means for moving said jaw members comprise driving cams.

11. A feed mechanism in accordance with claim 7 wherein said means for confining said mat at said stamping position comprise mating ways extending from the sides of said longitudinally extending channel, said ways being adjustable in position to assure close confinement of said mat and proper alignment thereof with respect to said die.

References Cited

UNITED STATES PATENTS

| | | | |
|---|---|---|---|
| 2,699,693 | 1/1955 | Stellin | 72—373 |
| 3,201,967 | 8/1965 | Balmauth et al. | 72—430 |
| 3,292,413 | 12/1966 | Falcioni | 72—377 |
| 2,704,333 | 3/1955 | Calosi et al. | 310—26 |

CHARLES W. LANHAM, *Primary Examiner.*

LOWELL A. LARSON, *Assistant Examiner.*

U.S. Cl. X.R.

72—406, 424

U.S. DEPARTMENT OF COMMERCE

PATENT OFFICE

Washington, D.C. 20231

UNITED STATES PATENT OFFICE
CERTIFICATE OF CORRECTION

Patent No. 3,436,950                                                   April 8, 1969

Paul J. Duncan et al.

It is certified that error appears in the above identified patent and that said Letters Patent are hereby corrected as shown below:

Column 1, line 47, "an" should read -- in --. Column 3, line 52, "mount" should read -- amount --. Column 4, lines 33, 50 and 55, and column 5, line 40, "if", each occurrence, should read -- of --. Column 4, line 36, "(FIGURE" should read --  FIGURE --. Column 5, line 36, "FIGURE" should read -- FIGURES --. Column 8, line 29, "Iuasmuch" should read -- Inasmuch --; line 48, after "journal" insert -- on said shaft --; line 60, after "of said" insert -- sleeve, thereby to shift the axis of rotation of said --.

Signed and sealed this 14th day of April 1970.

(SEAL)
Attest:

Edward M. Fletcher, Jr.                                  WILLIAM E. SCHUYLER, JR.

Attesting Officer                                                 Commissioner of Patents